(12) United States Patent
Betz et al.

(10) Patent No.: US 7,672,971 B2
(45) Date of Patent: Mar. 2, 2010

(54) MODULAR ARCHITECTURE FOR ENTITY NORMALIZATION

(75) Inventors: Jonathan T. Betz, Summit, NJ (US); Farhan Shamsi, Rego Park, NY (US)

(73) Assignee: Google Inc., Mountain View, CA (US)

( * ) Notice: Subject to any disclaimer, the term of this patent is extended or adjusted under 35 U.S.C. 154(b) by 259 days.

(21) Appl. No.: 11/356,838

(22) Filed: Feb. 17, 2006

(65) Prior Publication Data

US 2007/0198598 A1 Aug. 23, 2007

(51) Int. Cl.
*G06F 7/00* (2006.01)
(52) U.S. Cl. ...................... 707/103; 709/203
(58) Field of Classification Search .................. 707/103
See application file for complete search history.

(56) References Cited

U.S. PATENT DOCUMENTS

| | | | |
|---|---|---|---|
| 5,475,819 A | 12/1995 | Miller et al. | |
| 5,560,005 A | 9/1996 | Hoover et al. | |
| 5,574,898 A | 11/1996 | Leblang et al. | |
| 5,680,622 A * | 10/1997 | Even | 717/154 |
| 6,820,081 B1 * | 11/2004 | Kawai et al. | 707/7 |
| 2003/0126102 A1 * | 7/2003 | Borthwick | 706/21 |
| 2003/0154071 A1 | 8/2003 | Shreve | |
| 2004/0107125 A1 | 6/2004 | Guheen et al. | |
| 2004/0143600 A1 * | 7/2004 | Musgrove et al. | 707/104.1 |
| 2006/0041597 A1 * | 2/2006 | Conrad et al. | 707/200 |
| 2006/0047838 A1 | 3/2006 | Chauhan | |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.
Dean, J. et al., "MapReduce: Simplified Data Processing on Large Clusters," To appear in OSDI 2004, pp. 1-13.
Etzioni, O. et al., "Web-scale Information Extraction in KnowItAll (Preliminary Results)," WWW2004, ACM, May 17-20, 2004, 11 pages.
Freitag, D. et al., "Boosted Wrapper Induction," American Association for Artificial Intelligence, 2000, 7 pages.
Guha, R. et al., "Disambiguating People in Search," WWW2004, ACM, May 17-22, 2004, 9 pages.

(Continued)

*Primary Examiner*—Pierre M Vital
*Assistant Examiner*—Truong V Vo
(74) *Attorney, Agent, or Firm*—Morgan, Lewis & Bockius LLP

(57) ABSTRACT

A system and method identifying duplicate objects from a plurality of objects. The system and method groups similar objects into buckets based on a selected grouper, matches objects within the same bucket based on a selected matcher, and identifies the matching objects as duplicate objects.

18 Claims, 9 Drawing Sheets

OTHER PUBLICATIONS

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's Piquant in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

* cited by examiner

Example Format of Facts in Repository (each fact is associated with an object ID)

Example Facts in Repository (each
fact is associated with an object ID)

Example Object
Reference Table**

FIG. 2(d)
Example Format of Facts in
Repository (each fact is associated
with an object ID)

Example Objects

| Object ID \ Attribute | Name | Phone Number | Type | Birthday | ISBN | Year of Publication | Trainer |
|---|---|---|---|---|---|---|---|
| O1 | John Doe | (703) 123-4567 | Human | | | | |
| O2 | Relativity | | | | 0517884410 | 1995 | |
| O3 | D.J. | (703) 123-4567 | Human | 05/18/1974 | | | |
| O4 | The Relativity | | Book | | 0517884410 | | |
| O5 | John Henry | | Horse | 03/09/1976 | | | Ron McAnally |

*FIG. 5(a)*

| Object ID | Fact Value that Signature is Based on |
|---|---|
| O1 | (703) 123-4567 |
| O2 | Relativity |
| O3 | (703) 123-4567 |
| O4 | 0517884410 |
| O5 | John Henry |

*FIG. 5(b)*

| Fact Value that Bucket Index is Based on | Object IDs of Objects Included in the Bucket |
|---|---|
| (703) 123-4567 | O1, O3 |
| Relativity | O2 |
| 0517884410 | O4 |
| John Henry | O5 |

*FIG. 5(c)*

| Object ID | Fact Value that Signature is Based on |
|---|---|
| O1 | john doe |
| O2 | relativity |
| O3 | dj |
| O4 | relativity |
| O5 | john henry |

*FIG. 5(d)*

| Fact Value that Bucket Index is Based on | Object IDs of Objects Included in the Bucket |
|---|---|
| john doe | O1 |
| relativity | O2, O4 |
| dj | O3 |
| john henry | O5 |

*FIG. 5(e)*

MODULAR ARCHITECTURE FOR ENTITY NORMALIZATION

CROSS-REFERENCE TO RELATED PATENT APPLICATIONS

This application is related to the following U.S. Applications all of which are incorporated by reference herein:
U.S. application Ser. No. 11/357,748, entitled "Support for Object Search", filed Feb. 17, 2006;
U.S. application Ser. No. 11/342,290, entitled "Data Object Visualization", filed on Jan. 27, 2006;
U.S. application Ser. No. 11/342,293, entitled "Data Object Visualization Using Maps", filed on Jan. 27, 2006;
U.S. application Ser. No. 11/356,679, entitled "Query Language", filed Feb. 17, 2006;
U.S. application Ser. No. 11/356,837, entitled "Automatic Object Reference Identification and Linking in a Browseable Fact Repository", filed Feb. 17, 2006;
U.S. application Ser. No. 11/356,851, entitled "Browseable Fact Repository", filed Feb. 17, 2006;
U.S. application Ser. No. 11/356,842, entitled "ID Persistence Through Normalization", filed Feb. 17, 2006;
U.S. application Ser. No. 11/356,728, entitled "Annotation Framework", filed Feb. 17, 2006;
U.S. application Ser. No. 11/341,069, entitled "Object Categorization for Information Extraction", filed on Jan. 27, 2006;
U.S. application Ser. No. 11/356,765, entitled "Attribute Entropy as a Signal in Object Normalization", filed Feb. 17, 2006;
U.S. application Ser. No. 11/341,907, entitled "Designating Data Objects for Analysis", filed on Jan. 27, 2006; and
U.S. application Ser. No. 11/342,277, entitled "Data Object Visualization Using Graphs", filed on Jan. 27, 2006.

TECHNICAL FIELD

The disclosed embodiments relate generally to fact databases. More particularly, the disclosed embodiments relate to identifying duplicate objects in an object collection.

BACKGROUND

Data is often organized as large collections of objects. When the objects are added over time, there are often problems with data duplication. For example, a collection may include multiple objects that represent the same entity. As used herein, the term "duplicate objects" or any variation thereof, is intended to cover objects representing the same entity. Duplicate objects are not necessarily identical; they can have different facts or different values of the same facts.

Duplicate objects are undesirable for many reasons. They increase storage cost and take a longer time to process. They lead to inaccurate results, such as an inaccurate count of distinct objects. They also cause data inconsistency. For example, subsequent operations affecting only some of the duplicate objects cause objects representing the same entity to be inconsistent.

Traditional approaches to identify duplicate objects assume a homogeneity in the input set (all books, all products, all movies, etc), and compare different facts of objects to identify duplication for objects of different types. For example, when identifying duplicate objects in a set of objects representing books, traditional approaches match the ISBN value of the objects; and when identifying duplicate objects in objects representing people, traditional approaches match the SSN value of the objects. One drawback of the traditional approaches is that they are only effective to specific types of objects, and tend to be ineffective when applied to a collection of objects with different types. Also, even if the objects in the collection are of the same type, these approaches are ineffective when the objects include incomplete or inaccurate information.

For these reasons, what is needed is a method and system that identifies duplicate objects in a large number of objects having different types and/or incomplete information.

SUMMARY

The invention is a system and method for identifying duplicate objects from a plurality of objects. Objects are grouped into buckets using a selected grouper. Objects within the same bucket are compared to each other using a selected matcher to identify duplicate objects. The grouper and the matcher are selected from a collection of groupers and matchers. This approach is computationally cost-efficient because objects are pair-wise matched only within a bucket, rather than pair-wise matched across all buckets. This approach can identify duplicate objects from objects with different types, and incomplete and/or inaccurate information by selecting groupers and matchers designed to handle such scenarios.

One method for identifying duplicate objects is as follows. A grouper is selected from a collection of groupers to apply to the objects and generate a signature for each of the objects. Objects sharing a same signature are grouped into the same bucket. A matcher is selected from a collection of matchers to match objects within the same bucket. Matching objects are determined to be duplicate objects.

These features are not the only features of the invention. In view of the drawings, specification, and claims, many additional features and advantages will be apparent.

BRIEF DESCRIPTION OF THE DRAWINGS

FIGS. 2(a)-2(d) are block diagrams illustrating a data structure for facts within a repository of FIG. 1 in accordance with preferred embodiments of the invention.

FIGS. 5(a)-(e) illustrate an example of identifying duplicate objects, in accordance with a preferred embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

System Architecture

Figure 1:
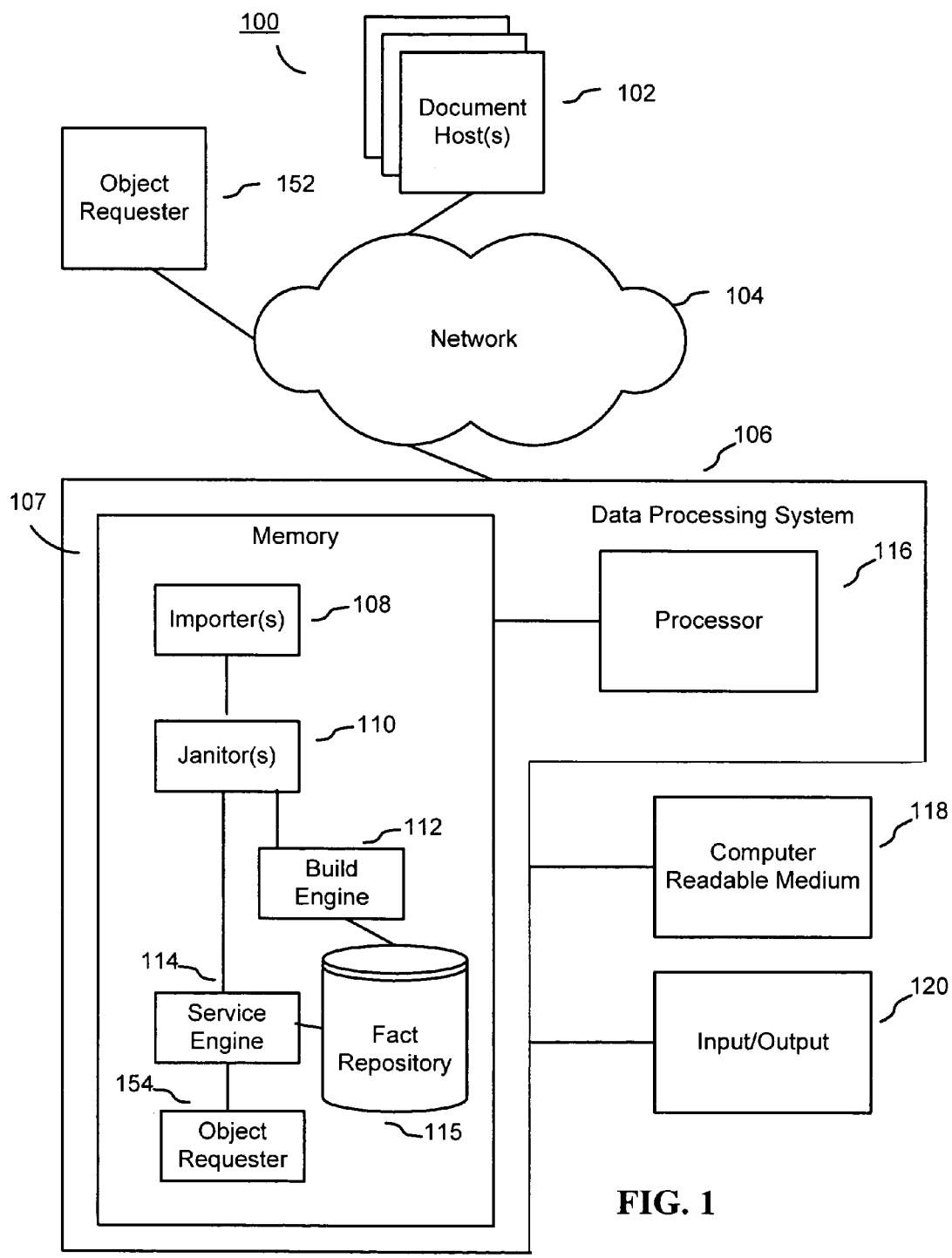
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Data Structure

FIG. 2(*a*) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2A:
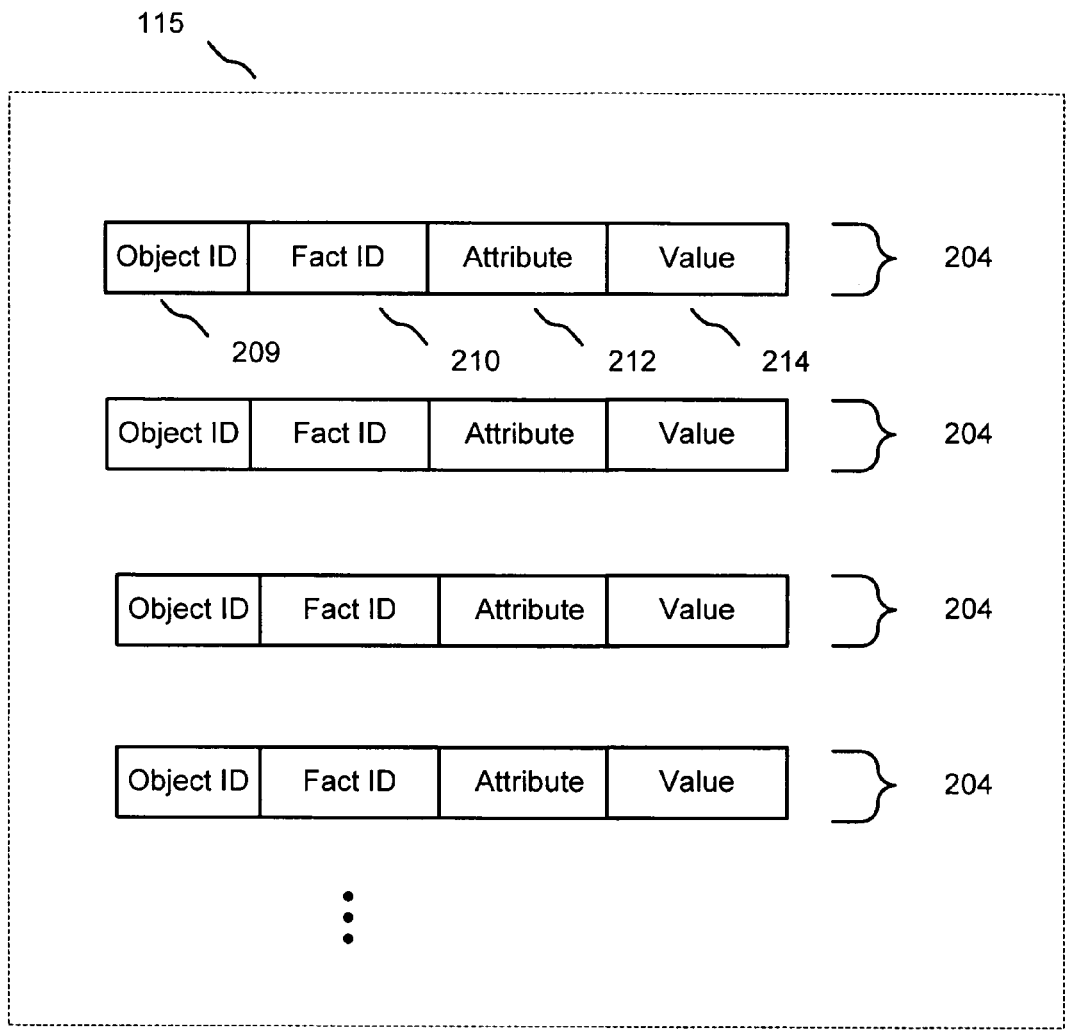
Figure 2B:
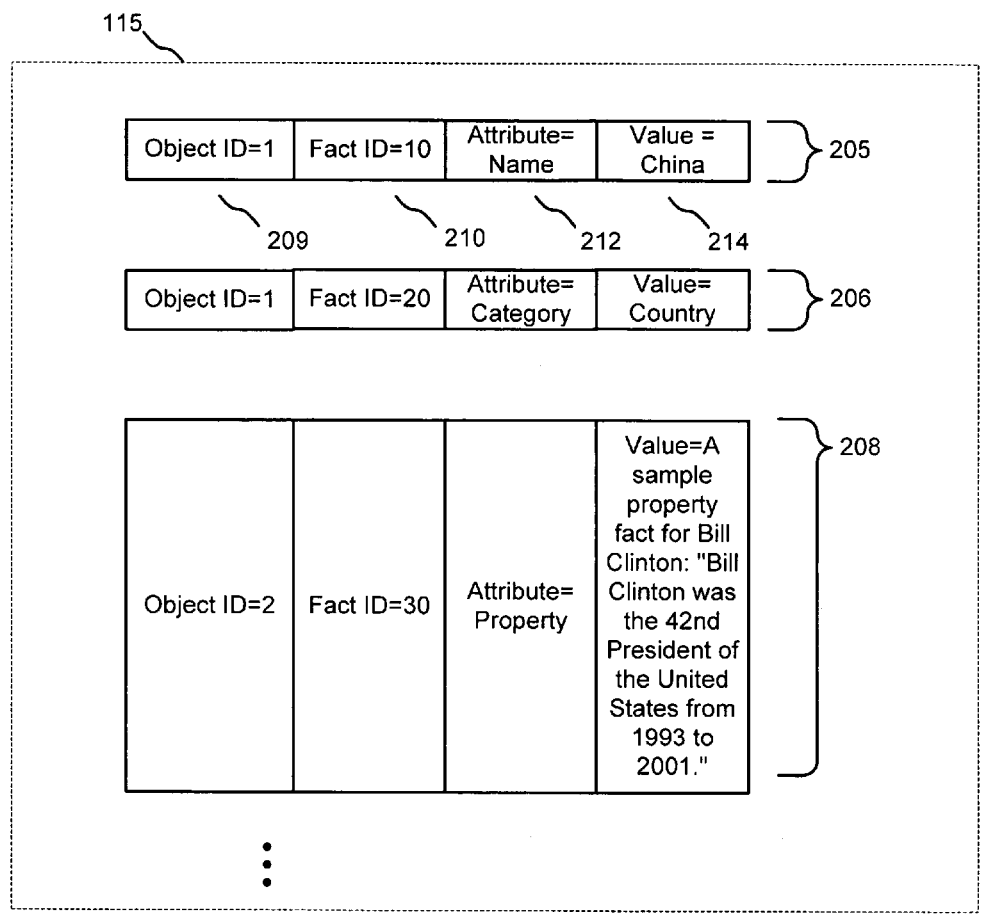
Figure 2C:
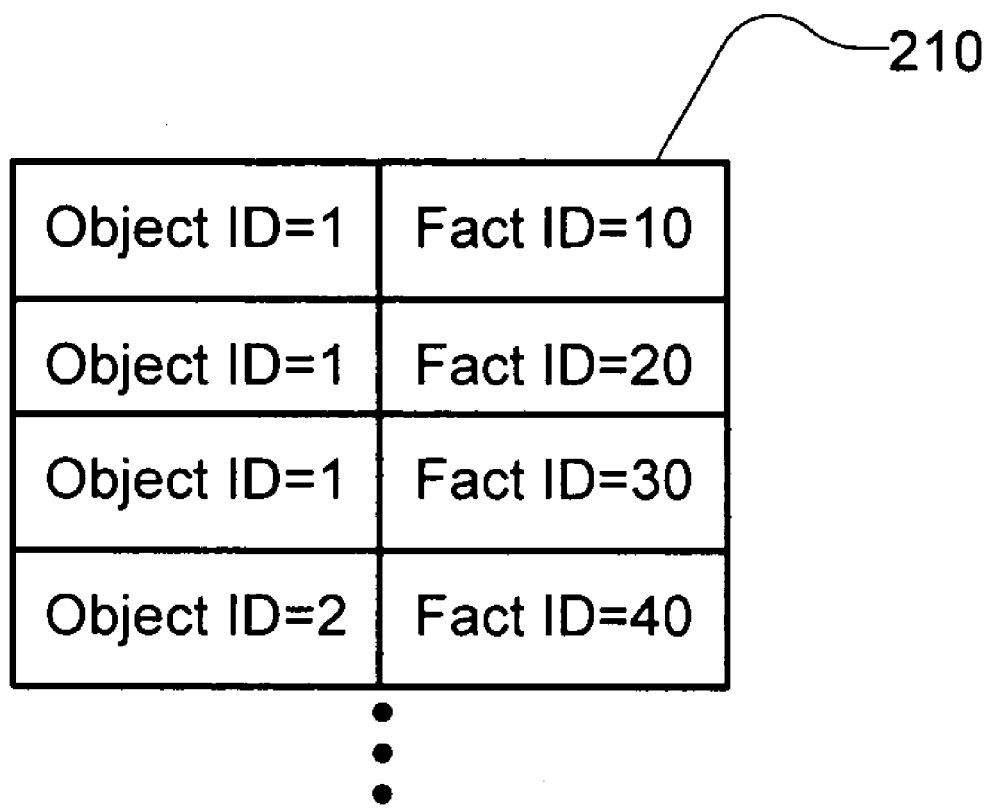
Figure 2E:
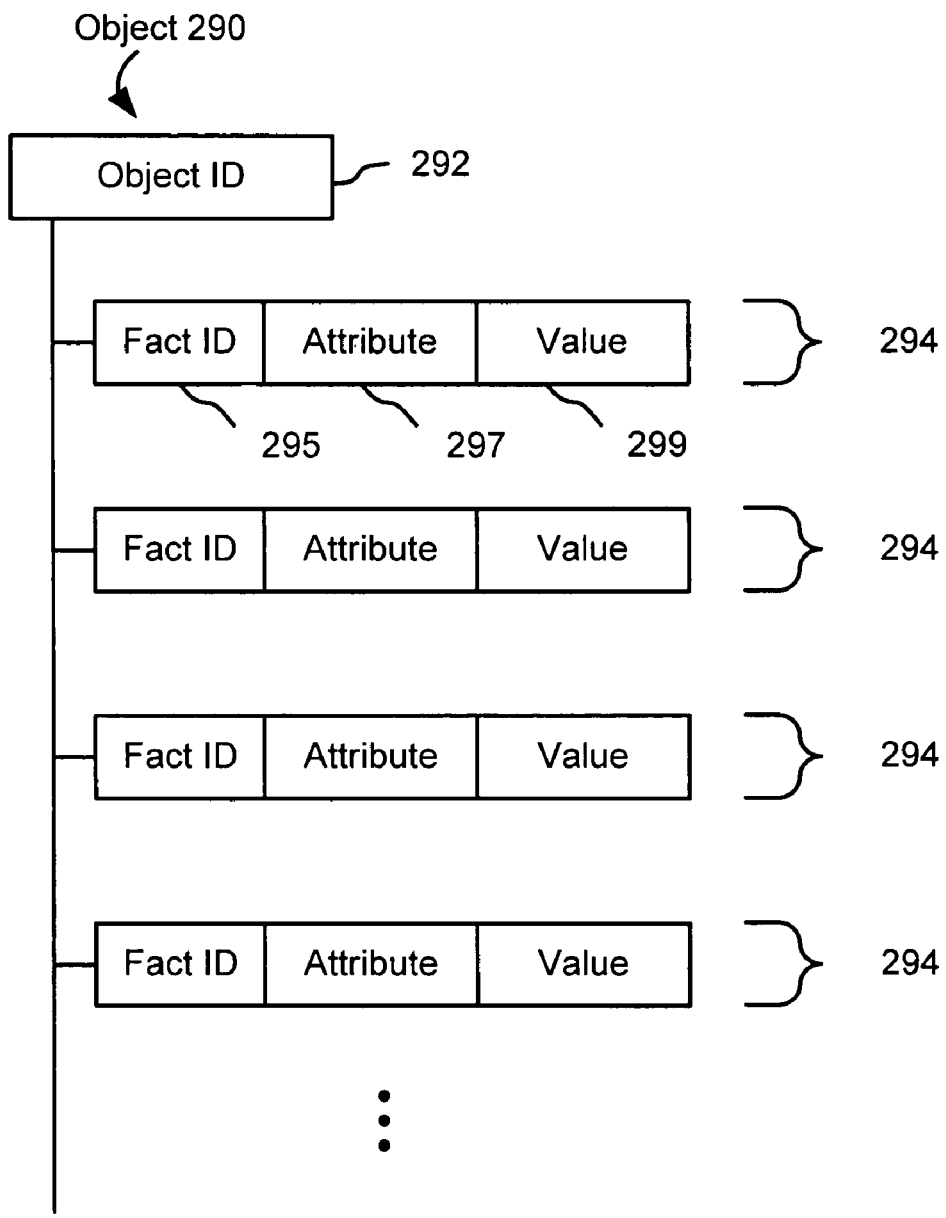
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Overview of Methodology

In one embodiment, the present invention is implemented in a janitor 110 to identify duplicate objects so that the duplicate objects can be merged together. The janitor 110 examines the object reference table 210, and reconstructs the objects based on the associations between object IDs and fact IDs maintained in the object reference table 210. Alternatively, the janitor 110 can retrieve objects by asking the service engine 114 for the information stored in the repository 115. Depending how object information is stored in the repository 115, the janitor 110 needs to reconstruct the objects based on the facts and object information retrieved.

Figure 3:
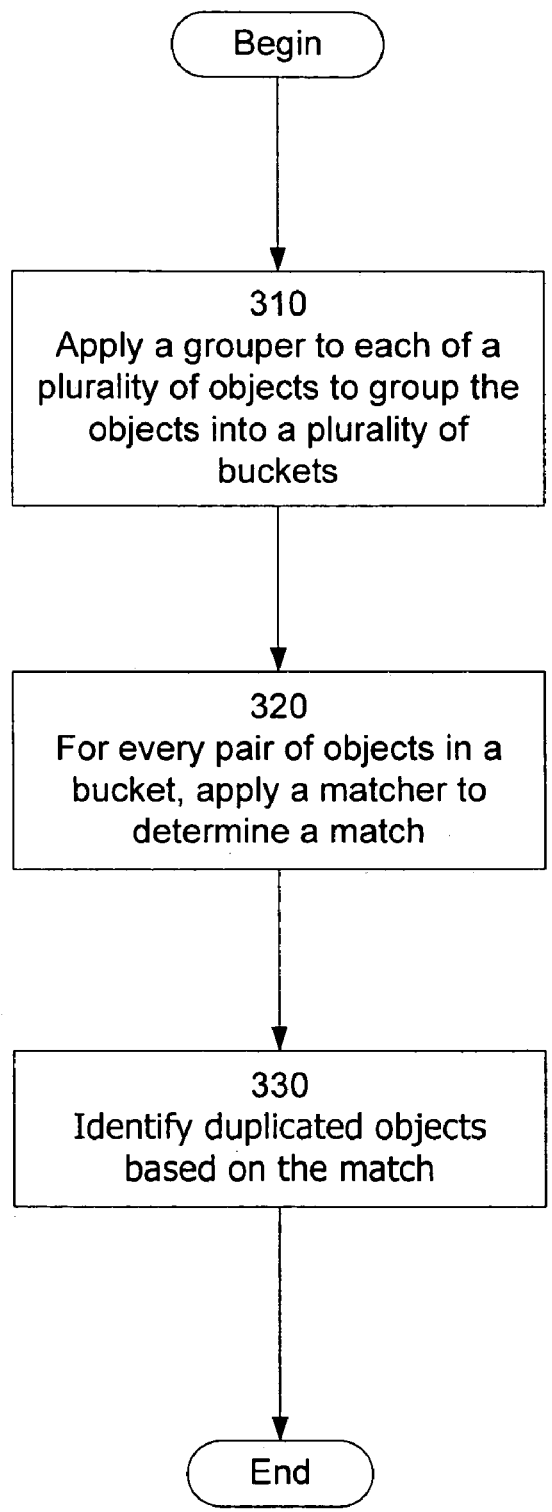
FIG. 3 is a flowchart of an exemplary method for identifying duplicate objects in accordance with a preferred embodiment of the invention.

Referring to FIG. 3, there is shown a flowchart of an exemplary method for identifying duplicate objects according to one embodiment of the present invention. The process illustrated in FIG. 3 may be implemented in software, hardware, or a combination of hardware and software.

The flowchart shown in FIG. 3 will now be described in detail, illustrated by the diagram in FIG. 4 and the example in FIGS. 5(a)-(e). The process commences with a set of objects 430 that may contain duplicate objects. For example, there may be multiple objects that represent the entity "George Washington." Each object 430 has a set of facts. As illustrated in FIG. 2(a), each fact 204 has an attribute 212 and a value 214 (also called fact value). An example of the set of objects 430 is shown in FIG. 5(a).

As shown in FIG. 5(a), objects O1 and O3 are duplicate objects representing the same entity, a Mr. John M. Doe with nickname D. J. O1 is associated with three facts with the following attributes: name, phone number, and type. O3 is associated with four facts: name, phone number, type, and birthday. Objects O2 and O4 are duplicate objects representing a book titled *The Relativity*. O2 is associated with three facts: name, ISBN, and year of publication. O4 is associated with three facts: name, type, and ISBN. Object O5 represents a race horse named John Henry. O5 is associated with four facts: name, type, birthday, and trainer. Among the duplicate objects, there are considerable variations in the associated facts. A preferred embodiment of the present invention can be used on collections of objects numbering from tens of thousands, to millions, or more.

Figure 4:
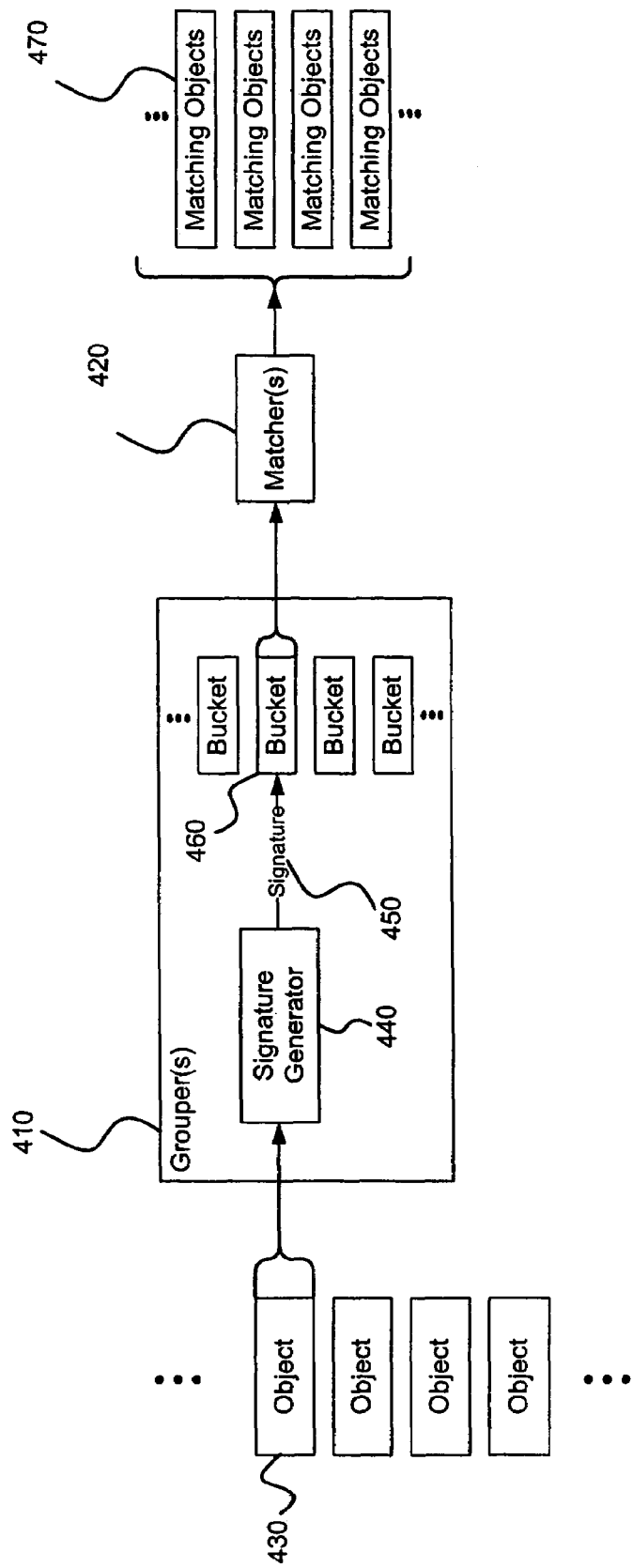
FIG. 4 is a simplified diagram illustrating an object being processed for identification of its duplicate objects in accordance with a preferred embodiment of the invention.

Referring to FIGS. 3 and 4, the janitor 110 applies 310 a grouper 410 to each object. The grouper 410 groups similar objects into buckets 460 such that if duplicate objects exist, they are included in the same bucket. It will be understood that non-duplicate objects will also be in the same bucket, but in any case, the large number of objects will be spread out among multiple buckets 460.

As illustrated in FIG. 4, when processing an object 430, the grouper 410 calls a signature generator 440 to generate a signature 450 based on the facts associated with the object 430. The signature generator 440 is designed to generate an identical signature for duplicate objects even if the facts associated with the objects are not duplicates. The signature generator 440 as shown in FIG. 4 is part of the grouper 410, but it can also be a separate function/module. The grouper 410 then puts the object 430 into an existing bucket 460 indexed by the signature 450. If there is no such bucket then a new bucket 460 is created, the signature 450 is assigned as the index of the bucket 460, and the object 430 is put into the bucket 460. When all objects 430 are processed by the grouper 410, those objects sharing a signature are in the same bucket.

It is noted that the signature generated by the signature generator 440 can be a null signature, a signature with an empty value. The grouper 410 does not place an object with a null signature into any bucket. As a result, objects with null signatures are neither compared nor merged with other objects. The signature generator 440 can generate a null signature because the object is not associated with necessary facts. Alternatively, the signature generator 440 can purposefully generate a null signature for certain objects to prevent the objects from being considered for merger.

In one example, the grouper 410 groups objects 430 based on the associated type value. A type value is the value of a fact with attribute type. If an object 430 has a type value of "human," the signature generator 440 generates the signature 450 based on the associated phone number value. A phone number value is the value of a fact with attribute phone number. If an object 430 has a type value of "book," the signature generator 440 generates the signature 450 based on the associated ISBN value. An ISBN value is the value of a fact with attribute ISBN. Otherwise, the signature generator 440 generates the signature 450 based on the name value. A name value is the value of a fact with attribute name. The grouper 410 then places the object 430 into a bucket 460 in accordance with the signature 450.

In one embodiment, the signature generator 440 generates the signature 450 by concatenating the fact values selected and removing any white space in the concatenated string.

FIG. 5(b) shows the fact value used by the above grouper 410 to generate a signature for each object. As described above, depending on the type value of the object 430, fact value used by the grouper 410 to generate the signature 450 for the object 430 varies. FIG. 5(c) shows in which buckets the objects are ultimately placed. Applying the above grouper 410, objects O1 and O3 are properly grouped into a bucket indexed by a signature 450 based on "(703) 123-4567," the phone number value of both objects. Objects O2 and O4 are placed in a bucket indexed by a signature 450 based on "Relativity" and a bucket indexed by a signature 450 based on "0517884410," respectively. Even though O2 and O4 represent the same entity, the signature generator 440 generates different signatures for them. Because no fact with attribute type is associated with O2, the signature generator 440 generates the signature 450 for O2 based on the associated name value. The type value of O4 is "book," thus the signature generator 440 generates the signature 450 for O4 based on the associated ISBN value. Because the grouper 410 groups objects based on the associated signature, O2 and O4 are placed into different buckets. O5 is grouped into a bucket indexed by a signature 450 based on "John Henry," the associated name value.

Alternatively, the grouper 410 can group objects solely based on the associated name values. In one example, the signature generator 440 applies some normalization rules to the associated name value to standardize the name value before generating the signature 450. Examples of the normalization rules include removal of punctuation, such as removing commas in a string, conversion of uppercase characters in a string to corresponding lowercase characters, such as from "America" to "america," and stop word removal, such as removing stop words such as "the" and "is" from a string.

FIG. 5(d) shows the name value used by the above grouper 410 to generate a signature for each object shown in FIG. 5(a). FIG. 5(e) shows in which buckets the objects are ultimately placed. Applying the above grouper 410, objects O2 and O4 are properly grouped into a bucket indexed by a signature 450 based on "relativity," the normalized name value of both objects, while O1 and O3 are placed in a bucket indexed by a signature 450 based on "john doe" and a bucket indexed by a signature 450 based on "dj," respectively. Because a signature 450 of an object is generated based on the associated normalized name value, the signature for O1 is based on "john doe" and the signature for O3 is based on "dj," as shown in FIG. 5(d). As a result, the grouper 410 places O1 and O3 into different buckets. O5 is grouped into a bucket indexed by a signature 450 based on "john henry," the associated normalized name value.

Alternatively, the grouper 410 groups objects based on several fact values associated with the object 430. For example, objects 430 with the same name value and birthday value are grouped into the same bucket 460 under one of such groupers 410.

In another embodiment, a grouper 410 can be a function or a module. The system selects the grouper 410 from a collection of grouper functions/modules. The collection of grouper functions/modules includes functions/modules provided by a third party, such as commercially available software libraries for software development, and functions/modules previously created.

By selecting different grouper functions/modules, the janitor 110 can detect duplicate objects created from incomplete/inaccurate data more accurately. Objects 430 created from incomplete data may not share facts, even if they represent the same entity. For example, an object 430 representing George Washington created based on a webpage devoted to his childhood may not have facts about his senior years, while another object 430 also representing George Washington created based on a webpage dedicated to his years of presidency probably would not have facts about his childhood. Similarly, facts created from different sources may not share the same values due to inaccurate data, even if the associated objects represent the same entity. As a result, no single grouper 410 can accurately and consistently group duplicate objects into the same bucket 460. By providing the ability to select a grouper 410, the janitor 110 can reuse the existing well-tested functions/modules, and select groupers 410 based on the specific needs.

For example, as illustrated in FIGS. 5(c) and 5(e), one grouper 410 properly groups O2 and O4 together, but mistakenly places O1 and O3 into different buckets, and another grouper 410 properly groups O1 and O3 together, but not O2 and O4. By providing the flexibility of selecting different grouper functions/modules, the janitor 110 can process the objects multiple times, each time selecting a different grouper function/module and matching duplicate objects based on the grouping. Using multiple groupers 410 detects duplicate objects more accurately than only using any single grouper 410.

There are many ways for the janitor 110 to select a grouper function/module. For example, the janitor 110 can select the grouper 410 based on predetermined system configuration. Alternatively, the selection can be determined at run time based on information such as the result of previous attempt to identify duplicate objects. For example, if many objects do not have the fact(s) looked at by the previously selected grouper, the janitor 110 selects a grouper 410 based on different fact(s).

After all objects are grouped into buckets 460, for every bucket 460 created, the janitor 110 applies 320 a matcher 420 to every two objects in the bucket 460, and identifies 330 the matching objects 470 as duplicate objects. The matcher 420 is designed to match duplicate objects based on the similarity of facts with the same attribute associated with the two objects (also called simply common facts). Similarity between two corresponding facts can be determined in a number of ways. For example, two facts are determined to be similar when the fact values are identical. In another example, two facts can be determined to be similar when the fact values are lexically similar, such as "U.S.A." and "United States." Alternatively, two facts are determined to be similar when the fact values are proximately similar, such as "176 pounds" and "176.1 pounds." In another example, two facts are determined to be similar when the fact values are similar based on string similarity measure (e.g., edit distance, Hamming Distance, Levenshtein Distance, Smith-Waterman Distance, Gotoh Distance, Jaro Distance Metric, Dice's Coefficient, Jaccard Coefficient to name a few).

For example, the matcher 420 determines whether two objects match based on the number of common facts with similar values (also called simply similar common facts) and the number of common facts with values that are not similar (also called simply dissimilar common facts). In one such matcher 420, two objects are deemed to match when there is more similar common fact than dissimilar common facts. Applying the above matcher 420 to the buckets shown in FIG. 5(*c*), O1 and O3 are determined to match because there are two similar common facts: phone number and type, and only one dissimilar common fact: name. As a result, the janitor 110 properly identifies O1 and O3 as duplicate objects.

In another example, the matcher 420 determines whether two objects match based on the proportion of similar common facts and all common facts.

Alternatively, the matcher 420 can determine whether two objects match based on one or a combination of associated facts. In one such matcher 420, two objects are deemed to match when a fact with attribute ISBN is a common fact, and the associated ISBN values are identical. Applying this matcher 420 to the buckets shown in FIG. 5(*e*), O2 and O4 are determined to match. As a result, the janitor 110 properly identifies O2 and O4 as duplicate objects.

Alternatively, the matcher 420 can determine whether two objects match based on the entropies of matching common facts. Entropy is a measure of randomness in a fact value, and can be used to determine the importance of matching (or mismatching) common facts in determining whether two objects are distinct or duplicates. For example, matching facts with attributes such as Social Security Number and ISBN is more significant than matching facts with attributes such as gender and nationality, and thus have higher entropies. Examples of how to calculate entropy and use entropy in identifying duplicate objects can be found in U.S. Utility patent application Ser. No. 11/356,765 for "Attribute Entropy as a Signal in Object Normalization," by Jonathan Betz, et al., filed Feb. 17, 2006. In one such matcher 420, if the sum of entropies of matching common facts is over a threshold, the matcher 420 determines the two objects match.

In another embodiment, the janitor 110 does not first apply the matcher 420 to every two objects in the bucket 460 and then identify the matching objects 470 as duplicate objects. Instead, the janitor 110 applies the matcher 420 to two objects in the bucket 460. If the matcher 420 indicates the two objects to be matching objects 470, the janitor 110 merges them, keeps the merged object in the bucket 460, and removes the other object(s) out of the bucket 460. Then, the janitor 110 restarts the process by applying the matcher 420 to two objects in the bucket 460 that have not been matched before. This process continues until the matcher 420 has been applied to every pair of objects in the bucket 460.

The janitor 110 can merge two objects in several different ways. For example, the janitor 110 can choose one of the two objects as the merged object, add facts only present in the other object to the merged object, and optionally reconcile the dissimilar common facts of the merged object. Alternatively, the janitor 110 can create a new object as the merged object, and add facts from the two matching objects to the merged object.

In another embodiment, just as a grouper 410, a matcher 420 can be a function or a module. The system selects the matcher 420 from a collection of matcher functions/modules. The collection of matcher functions/modules includes functions/modules provided by a third party and functions/modules previously created. By providing the ability to select a matcher 420, the janitor 110 can reuse the existing well-tested functions/modules, and select matcher 420 based on the specific needs.

As stated above, one matcher properly matches O2 and O4, but not O1 and O3, and another matcher properly matches O1 and O3, but not O2 and O4. By providing the flexibility of selecting different matcher functions/modules, the janitor 110 can process the objects multiple times, each time selecting a different grouper-matcher combination, and identify duplicate objects more accurately.

There are many ways for the janitor 110 to select a matcher function/module. For example, the janitor 110 can select the matcher 420 based on system configuration data. Alternatively, the selection can be determined at run time based on information such as the grouper 410 selected. For example, if the resulting buckets of the grouper 410 include many objects, the janitor 110 selects a matcher function/module requiring a higher entropy threshold.

Duplicate objects are objects representing the same entity but each having a different object ID. After identifying 330 the matching objects as duplicate objects, the janitor 110 can merge the duplicate objects into a merged object, so that each entity is represented by no more than one object and each fact that is associated with a same entity will have the same object ID.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of identifying duplicate objects in a plurality of objects, the method comprising:
   generating signatures for two or more objects of the plurality of objects based on facts associated with the two or more objects, wherein the plurality of objects is included in a fact repository, wherein signatures for duplicate objects are identical even if at least some facts associated with the duplicate objects are different, and wherein generating a respective signature for a respective object based on facts associated with the respective object includes:

retrieving, from the fact repository, a type value associated with a type attribute of a fact associated with the respective object, wherein the type value categorizes an entity represented by the respective object;

selecting an attribute of the fact associated with the respective object based on the type value of the fact; and generating the respective signature based on a value associated with the selected attribute, wherein each of the plurality of objects is associated with one or more facts, each of the one or more facts having a value, and wherein generating the respective signature comprises generating the respective signature for each of the two or more of the plurality of objects by deriving the respective signatures from the value of at least one associated fact of the each of the two or more of the plurality of objects;

grouping the two or more objects of the plurality of objects into a plurality of buckets based on the generated signatures, wherein the grouping comprises, responsive to an identifier of an existing bucket being the same as the signature of an object, the object being one of the two or more of the plurality of objects, adding the object to the existing bucket, and otherwise establishing a new bucket including the object, an identifier of the new bucket being same as the signature of the object;

applying a matcher to respective pairs of objects in one of the plurality of buckets to determine if the respective pairs of objects are duplicates; and merging one or more of the objects determined by the matcher to be duplicates.

2. The method of claim 1, including:

applying a grouper to the two or more of the plurality of objects wherein the grouper is selected from a collection of groupers, wherein grouping includes grouping the two or more of the plurality of objects into the plurality of buckets by applying the selected grouper to the two or more of the plurality of objects.

3. The method of claim 1, further comprising:

selecting the matcher from a collection of matchers, wherein applying the matcher includes applying the selected matcher to each pair of objects in one of the plurality of buckets to determine if the pair of objects are duplicates.

4. The method of claim 1, wherein each of the plurality of objects is associated with one or more facts, and wherein at least two objects of the plurality of objects have different facts.

5. The method of claim 1, wherein each of the one or more facts has an attribute, and wherein the at least one fact includes at least one selected from the group consisting of: fact with attribute name, fact with attribute ISBN, and fact with attribute UPC.

6. The method of claim 1, wherein each of the plurality of objects is associated with one or more fact, each of the one or more facts having a value, and wherein applying the matcher to each pair of objects in one of the plurality of buckets comprises:

for each common fact of the pair of objects, determining a similarity of the values of the common fact based on a similarity measure; and determining that the pair of objects are duplicates based on the similarity.

7. The method of claim 6, wherein determining that the pair of objects are duplicates comprises:

determining that the pair of objects are duplicates based on the number of the common facts with similar values and the number of common facts.

8. The method of claim 6, wherein each of the one or more facts has an entropy, and wherein determining that the pair of objects are duplicates comprises:

determining that the pair of objects are duplicates based on the entropies of the common facts with similar values.

9. A system for identifying duplicate objects in a plurality of objects, comprising:

a processor for executing programs; and a subsystem executable by the processor, the subsystem including:

instructions for generating signatures for two or more objects of the plurality of objects based on facts associated with the two or more objects, wherein the plurality of objects is included in a fact repository, wherein signatures for duplicate objects are identical even if at least some facts associated with the duplicate objects are different, and wherein the instructions for generating a respective signature for a respective object based on facts associated with the respective object include instructions for:

retrieving, from the fact repository, a type value associated with a type attribute of a fact associated with the respective object, wherein the type value categorizes an entity represented by the respective object;

selecting an attribute of the fact associated with the respective object based on the type value of the fact; and generating the respective signature based on a value associated with the selected attribute, wherein each of the plurality of objects is associated with one or more facts, each of the one or more facts having a value, and wherein the instructions for generating the respective signature comprises instructions for generating the respective signature for each of the two or more of the plurality of objects by deriving the respective signature from the value of at least one associated fact of the each of the two or more of the plurality of objects;

instructions for grouping the two or more objects of the plurality of objects into a plurality of buckets based on the generated signatures, wherein the instruction for grouping include instructions for, responsive to an identifier of an existing bucket being the same as the signature of an object, the object being one of the two or more of the plurality of objects, adding the object to the existing bucket, and otherwise establishing a new bucket including the object, an identifier of the new bucket being same as the signature of the object;

instructions for applying a matcher to respective pairs of objects in one of the plurality of buckets to determine if the respective pairs of objects are duplicates; and instructions for merging one or more of the objects determined by the matcher to be duplicates.

10. A computer program product for use in conjunction with a computer system, the computer program product comprising a computer readable storage medium and a computer program mechanism embedded therein, the computer program mechanism including:

instructions for generating signatures for two or more objects of the plurality of objects based on facts associated with the two or more objects, wherein the plurality of objects is included in a fact repository, wherein signatures for duplicate objects are identical even if at least some facts associated with the duplicate objects are different, and wherein the instructions for generating a respective signature for a respective object based on facts associated with the respective object include instructions for:

retrieving, from the fact repository, a type value associated with a type attribute of a fact associated with the respective object: wherein the type value categorizes an entity represented by the respective object;

selecting an attribute of the fact associated with the respective object based on the type value of the fact; and generating the respective signature based on a value associated with the selected attribute, wherein each of the plurality of objects is associated with one or more facts, each of the one or more facts having a value, and wherein the instructions for generating the respective signature comprises instructions for generating the respective signature for each of the two or more of the plurality of objects by deriving the respective signature from the value of at least one associated fact of the each of the two or more of the plurality of objects;

instructions for grouping the two or more objects of the plurality of objects into a plurality of buckets based on the generated signatures, wherein the instructions for grouping include instructions for, responsive to an identifier of an existing bucket being the same as the signature of an object, the object being one of the two or more of the plurality of objects, adding the object to the existing bucket, and otherwise establishing a new bucket including the object, an identifier of the new bucket being same as the signature of the objects;

instructions for applying a matcher to respective pairs of objects in one of the plurality of buckets to determine if the respective pairs of objects are duplicates; and instructions for merging one or more of the objects determined by the matcher to be duplicates.

11. The system of claim 9, including:
instructions for applying a grouper to the two or more of the plurality of objects wherein the grouper is selected from a collection of groupers, wherein grouping includes grouping the two or more of the plurality of objects into the plurality of buckets by applying the selected grouper to the two or more of the plurality of objects.

12. The system of claim 9, including:
instructions for selecting the matcher from a collection of matchers, wherein applying the matcher includes applying the selected matcher to each pair of objects in one of the plurality of buckets to determine if the pair of objects are duplicates.

13. The system of claim 9, including:
instructions for adding the object to the existing bucket responsive to an identifier of an existing bucket being the same as the signature of an object, the object being one of the two or more of the plurality of objects; and
instructions for establishing a new bucket including the object, an identifier of the new bucket being same as the signature of the object, responsive to an identifier of an existing bucket not being the same as the signature of an object, the object being one of the two or more of the plurality of objects.

14. The system of claim 9, including:
instructions for determining a similarity of the values of a common fact based on a similarity measure for each common fact of the pair of objects; and
instructions for determining that the pair of objects are duplicates based on the similarity.

15. The computer program product of claim 10, including:
instructions for applying a grouper to the two or more of the plurality of objects wherein the grouper is selected from a collection of groupers, wherein grouping includes grouping the two or more of the plurality of objects into the plurality of buckets by applying the selected grouper to the two or more of the plurality of objects.

16. The computer program product of claim 10, including:
instructions for selecting the matcher from a collection of matchers, wherein applying the matcher includes applying the selected matcher to each pair of objects in one of the plurality of buckets to determine if the pair of objects are duplicates.

17. The computer program product of claim 10, including:
instructions for adding the object to the existing bucket responsive to an identifier of an existing bucket being the same as the signature of an object, the object being one of the two or more of the plurality of objects; and
instructions for establishing a new bucket including the object, an identifier of the new bucket being same as the signature of the object, responsive to an identifier of an existing bucket not being the same as the signature of an object, the object being one of the two or more of the plurality of objects.

18. The computer program product of claim 10, including:
instructions for determining a similarity of the values of a common fact based on a similarity measure for each common fact of the pair of objects; and
instructions for determining that the pair of objects are duplicates based on the similarity.

* * * * *